(12) United States Patent
Freytag

(10) Patent No.: US 12,240,278 B2
(45) Date of Patent: Mar. 4, 2025

(54) TIRES AND WHEELS COMPRISING ADJUSTABLE STIFFENING LINES, AND MACHINES HAVING SAME

(71) Applicant: AGCO International GmbH, Neuhausen (CH)

(72) Inventor: Erich Freytag, Sachsenried (DE)

(73) Assignee: AGCO International GmbH, Neuhausen (CH)

( * ) Notice: Subject to any disclaimer, the term of this patent is extended or adjusted under 35 U.S.C. 154(b) by 71 days.

(21) Appl. No.: 17/645,898

(22) Filed: Dec. 23, 2021

(65) Prior Publication Data
US 2022/0203767 A1    Jun. 30, 2022

(30) Foreign Application Priority Data
Dec. 24, 2020    (EP) .................................... 20217289

(51) Int. Cl.
*B60C 17/00* (2006.01)
*B60C 9/02* (2006.01)
*B60C 11/03* (2006.01)

(52) U.S. Cl.
CPC ............... *B60C 9/02* (2013.01); *B60C 11/03* (2013.01); *B60C 2009/0269* (2013.01); *B60C 2011/0334* (2013.01)

(58) Field of Classification Search
CPC ....... B60C 17/01; B60C 17/009; B60C 19/00; B60C 5/24; B60C 5/22; B60C 5/05; B60C 5/20; B60C 5/025; B60C 5/02; B60C 5/008; B60C 5/007; B60C 5/004; B60C 5/001
See application file for complete search history.

(56) References Cited

U.S. PATENT DOCUMENTS

| | | | | |
|---|---|---|---|---|
| 2,708,470 | A * | 5/1955 | Gramelspacher | B60C 11/18 152/208 |
| 2013/0087262 | A1* | 4/2013 | Hennig | B60C 23/00 152/417 |
| 2015/0239302 | A1* | 8/2015 | Marsaly | B60C 5/24 152/518 |

(Continued)

FOREIGN PATENT DOCUMENTS

| | | | |
|---|---|---|---|
| CN | 103879242 B | * | 5/2016 |
| CN | 211869086 U | * | 11/2020 |

(Continued)

OTHER PUBLICATIONS

European Patent Office, Search Report for related European Application No. EP21208912, dated Apr. 20, 2022.

(Continued)

*Primary Examiner* — Cedrick S Williams

(57) ABSTRACT

A tire has a carcass with a tread, a bead, a shoulder, and a sidewall. The bead, shoulder, and sidewall partially define a first internal cavity. At least one stiffening line for a pressurized fluid with a second cavity is within the carcass. The second cavity is aligned in an approximately transverse direction relative to the periphery of the tire. The second cavity is connectable to pressurized fluid supply system and can be inflated or deflated to adjust the stiffness of the tire. The stiffening lines may be inflated using a hydraulic fluid to increase the stiffness of the tire. Related wheels, vehicles, and methods are also disclosed.

20 Claims, 4 Drawing Sheets

(56) References Cited

U.S. PATENT DOCUMENTS

2021/0086564 A1\* 3/2021 Van Tilburg ........ B60C 11/1637

FOREIGN PATENT DOCUMENTS

| DE | 3943054 A * | 7/1991 | ......... B60C 11/1612 |
|----|----|----|----|
| DE | 9406047 U1 * | 9/1994 | |
| DE | 102009011284 A1 | 9/2010 | |
| EP | 0290328 A1 | 11/1988 | |
| EP | 0440083 A1 | 8/1991 | |
| EP | 2 502 760 A1 | 9/2012 | |
| EP | 2 738 023 A1 | 6/2014 | |
| GB | 1550537 A | 8/1979 | |
| GB | 2 554 459 A | 4/2018 | |
| GB | 2575269 A | 1/2020 | |
| KR | 20120063895 A * | 6/2012 | ........... B60C 23/004 |
| RU | 2740831 C1 | 4/2020 | |
| WO | 2018/060669 A1 | 5/2018 | |

OTHER PUBLICATIONS

UK Intellectual Property Office, Search report for related UK Application No. GB2100500.4, dated Jun. 14, 2021.

\* cited by examiner

TIRES AND WHEELS COMPRISING ADJUSTABLE STIFFENING LINES, AND MACHINES HAVING SAME

CROSS-REFERENCE TO RELATED APPLICATIONS

This application claims the benefit of the filing date of European Patent Application 20217289.6, "Tire Comprising Adjustable Stiffening Lines," filed Dec. 24, 2020, the entire disclosure of which is incorporated herein by reference.

FIELD

The present disclosure relates to an arrangement installed in or integrated into a tire, and more particularly to an arrangement which allows rapid alteration of tire flexibility by adjusting wall stiffness. A machine, especially an agricultural machine such as an agricultural vehicle, having such a tire and stiffness-alteration arrangement is also included.

BACKGROUND

Generally, a working machine (e.g., a tractor, harvester, skid steer, etc.) includes a set of tires that supports the work machine. The tires are inflated and configured to rotate to enable the work machine to travel across a field, a road, and other types of terrain. These machines are increasingly being equipped with onboard tire-pressure adjustment devices, by which the tire pressures of the machine wheels are increased or decreased.

While driving in the field, the focus is on efficient traction power transmission with the lowest possible slippage. It is known that a partially deflated tire can achieve greater traction on uneven and/or soft ground. A large tire contact area and a well toothed cleat profile reduce the slippage of the tire. With decreasing air pressure in the tires of the work machine, the ground pressure (the pressure exerted on the ground by the tires or tracks of a work machine) decreases; therefore, the air pressure should be as low as practicable to prevent an unnecessarily high soil compaction.

Abrasion is an important factor for the tires when travelling on a road. On asphalt, the rubber abrasion of the studs is much greater than on cultivated soil. When driving on the road, a high air pressure in the tire is needed. Low wear-and-tear, lower rolling resistance, and the associated lower tractive power requirement and diesel consumption are economically significant arguments for the highest possible air pressure in the tire, resulting in a small tire contact patch on the road. In addition, driving safety is increased because the tire deflection is lower and therefore the machine fluctuates less, especially when cornering.

However, deflating (and subsequently inflating) the whole tires of a machine at each interchange between highway and off-road is generally too time-consuming and therefore impractical.

There are different approaches to solve this problem. There are for example wheel assemblies such as that disclosed in International Patent Publication WO 2018/060669 A1, "Wheel Assembly," published Apr. 5, 2018, which comprise a wheel hub and a tire which define a substantially fixed volume and are further provided with an actuator that separates the fixed volume into two sub-volumes. A change of pressure within each of the sub-volumes can be caused to adjust the tire pressure. However, there is still a large volume to be filled depending on the size of the tire, and the manufacturing and assembly process of these tires is complex and time consuming.

Another approach to solve this problem is the usage of tire pressure adjustment devices, for example compressors fixed onto the tires, which are commonly used in tractors and other machines to adjust the tire contact patch to the different ground types. Often an additional compressor is necessary and even though it is less time consuming than manually deflating the tires with the main pressure source of the work machine, for example a tractor, it still takes up to multiple minutes depending on the needed pressure. During this process the tractor cannot or should not drive.

BRIEF SUMMARY

In some embodiments, a tire includes a carcass, a tread, a bead, a shoulder and a sidewall, and defines a first cavity. The tire has at least one stiffening line for a pressurized fluid with a second cavity within the carcass. The second cavity is aligned in an approximately transverse direction relative to the periphery of the tire and is configured to be fluidly connected with a pressurized fluid supply system to adjust the stiffness of the tire.

The rigidity of the stiffening line is varied by adjusting the fluid pressure within second cavity. This adjusts the surface rigidity and area of the contact patch of the tire without necessarily adjusting the pressure within the larger first cavity. The tire may be a pneumatic tire in which pressurized air is introduced in to the first cavity to inflate the tire, and the at least one stiffening line can be configured to be inflated using a hydraulic fluid.

In an embodiment, the tire has a plurality of stiffening lines spaced at regular intervals around the periphery of the tire. However, the tire can comprise just one stiffening line.

The stiffening lines may be located adjacent the first cavity along the carcass of the tire. The volume of the second cavity is typically much smaller than that of the first cavity. The stiffening lines can generate a certain stiffness within seconds when pressurized via a pressurized fluid supply system because the small volume can quickly be filled with a pressurized fluid. The stiffening lines can be connected to each other for a conjoint pressurization, such as by at least one supply line or hose. The at least one supply line can connect multiple stiffening lines into groups, but it is also possible to connect all stiffening lines to a single supply line. In an embodiment, the stiffening lines are configured to be fluidly connected with a pressurized fluid supply system via the at least one supply line. In an embodiment, the stiffening lines are connected to each other by means of two supply lines, whereby the supply lines are located on the two different side walls with the first cavity of the tire between them.

The number of stiffening lines may be determined by the size of the tire. Multiple stiffening lines can be used to achieve a fast and balanced stiffness. Though the arrangement can be applied to any machine using one or more tires, especially pneumatic tires, the arrangement has particular application for tires on agricultural machines such as tractors, but also to trailers, agricultural implements, and other work machines.

A common tire pressure adjustment device may take up to fifteen (15) minutes to change the tire pressure from 0.8 bar to 2.4 bar, which is a common level of adjustment for a tire of a tractor transitioning from a field working mode to a road travelling mode. In contrast, the stiffening lines need only seconds to be pressurized and therefore deliver rapid adjustment of the tire stiffness because of their small volume relative to the whole tire (i.e., the first cavity) volume.

In a field working mode, only a low tire pressure is needed, so the stiffening lines are depressurized so that they are soft and pliable, resulting in increased flexibility at the tire surface and providing the tire with a large contact patch.

In a road travelling mode, a small tire contact patch is preferable, which is provided by a high tire pressure in conventional tires. In the tires disclosed herein, the stiffening lines are pressurized with a pressurized fluid, preferably hydraulic oil. The stiffening lines therefore stiffen (become unyielding) and create a stiff carcass to achieve the needed smaller tire contact patch.

The stiffening lines may be pressurized by a pressurized fluid supply system on the machine to which they are fitted. This may be an existing pressurized fluid supply system, such as hydraulic pressurized fluid supply system of the machine, to which the tire is fitted, but it could alternatively be an additional pressurized fluid supply system, which is attached to the machine or the wheel hub. For example, tractors often have a pressurized hydraulic fluid supply system that can pressurize the at least one stiffening line. When a small tire contact patch is needed for the road travelling mode, the pressurized fluid supply system increases the pressure in the at least one supply line and the stiffening lines. To reduce the risk of damage while the system is running, a controlling element may be integrated into the supply line or the stiffening line of the tire at a point where it can close the fluid connection between the second cavities of the stiffening lines and the pressurized fluid supply system. The controlling element may be a valve, for example an electromagnetic closing valve.

The stiffening lines may be arranged inside of the first cavity of the tire and attached to the inner side of the first cavity. The stiffening lines may be firmly attached within the first cavity of the tire, such as by vulcanization. Other known attachment methods would also be possible like using glue, brackets, or straps, or functional equivalents thereof.

In an alternative configuration, the stiffening lines are not firmly attached all across the inside of the first cavity of the tire, but instead they are arranged loosely inside of the first cavity of the tire but anchored at one or more points relative to the first cavity wall to produce the required stiffness in the same when pressurized.

In another embodiment, the stiffening lines are integrated directly into the carcass of the tire.

The second cavities of the stiffening lines may be aligned in an approximately transverse direction with regard to the periphery of the tire.

In accordance with another embodiment, there is provided a machine, especially an agricultural machine such as a tractor, having at least one tire in accordance with the aspect first defined above.

The machine may have a pressurized fluid supply system to which the second cavity of the at least one stiffening line is fluidly connected. The pressurized fluid supply system may be a pressurized hydraulic fluid supply system. The machine may have a control system for regulating the pressure of fluid in the at least one stiffening line to vary the stiffness of the tire.

BRIEF DESCRIPTION OF THE DRAWINGS

Further advantages of the disclosure will become apparent from reading the following description of specific embodiments with reference to the appended drawings in which.

DETAILED DESCRIPTION

Figure 1:
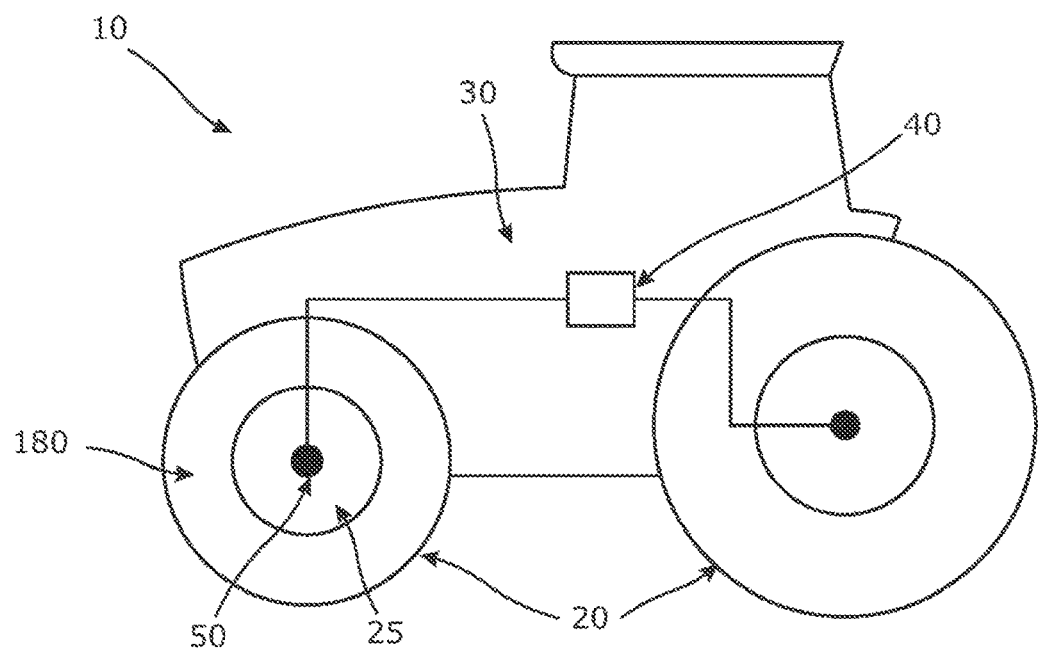
FIG. 1 shows an agricultural machine in the form of a tractor, including one or more tires suitably according to an embodiment.

FIG. 1 shows an agricultural machine in form of a tractor 10 comprising tires 20, each attached to a respective wheel hub 25 supporting a chassis, together with a pressure supply system 30, which comprises at least a pump 40 and a rotary union 50. The tires 20 are connected to the pressure supply system 30 of the tractor 10 via the rotary union 50, which provides a seal between a stationary supply passage connected to the pressure supply system 30, and fluid guiding components. The rotary union 50 is connected and rotating with the tire 20, to permit the flow of a fluid, typically hydraulic oil, into and/or out of the rotating part.

Figure 2:
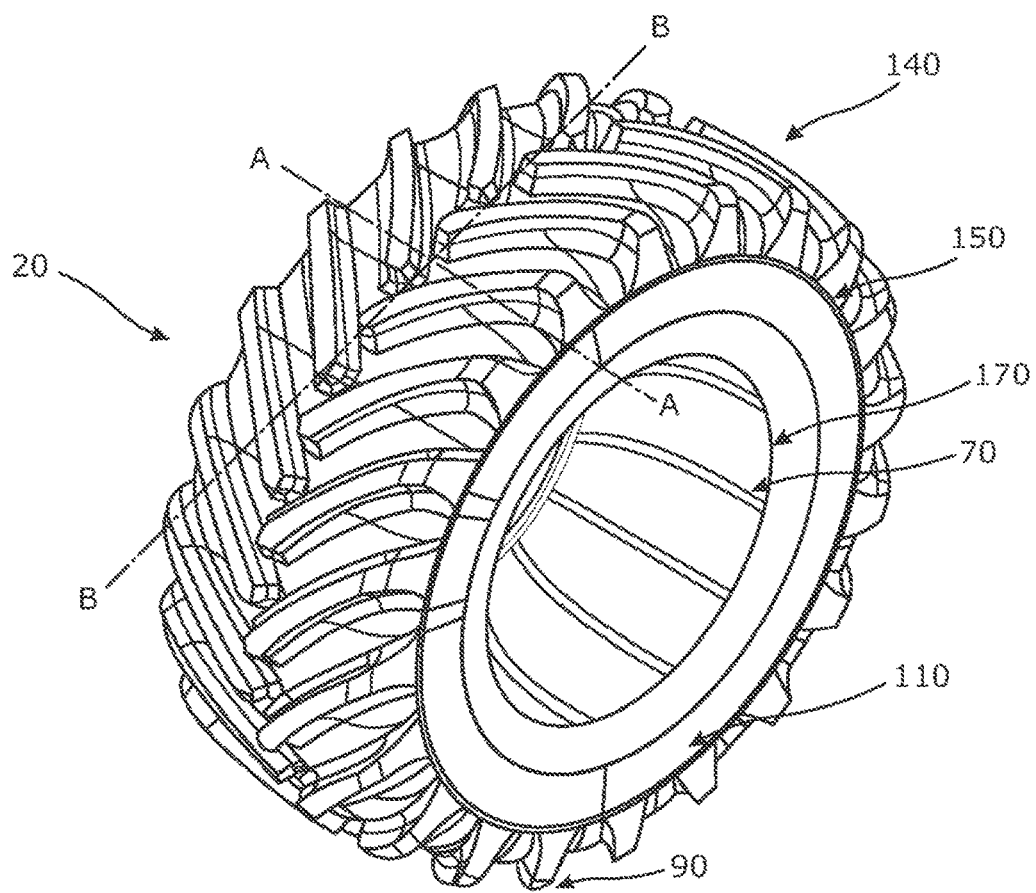
FIG. 2 shows a tire that may be used by the tractor of FIG. 1.
Figure 3:
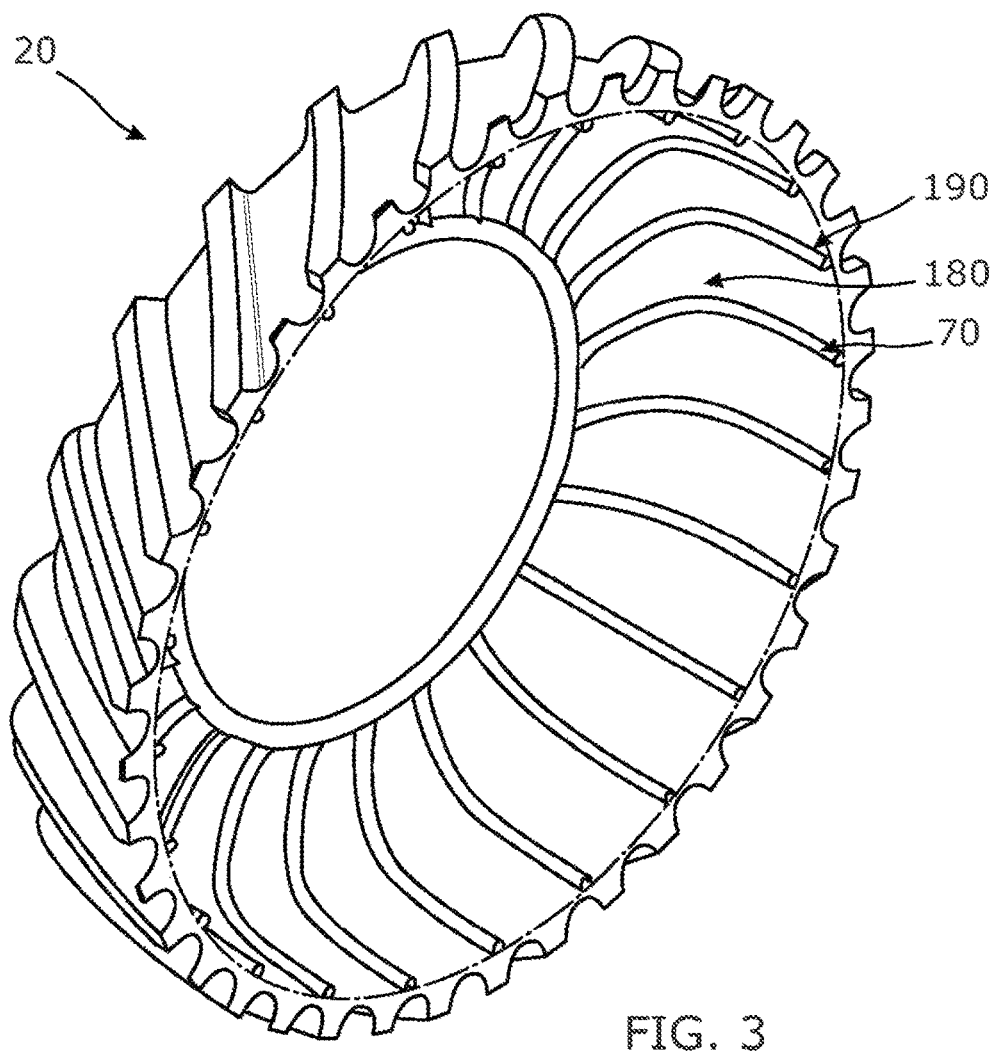
FIG. 3 shows a sectional view through the tire indicated with the line B-B in FIG. 2.
Figure 4:
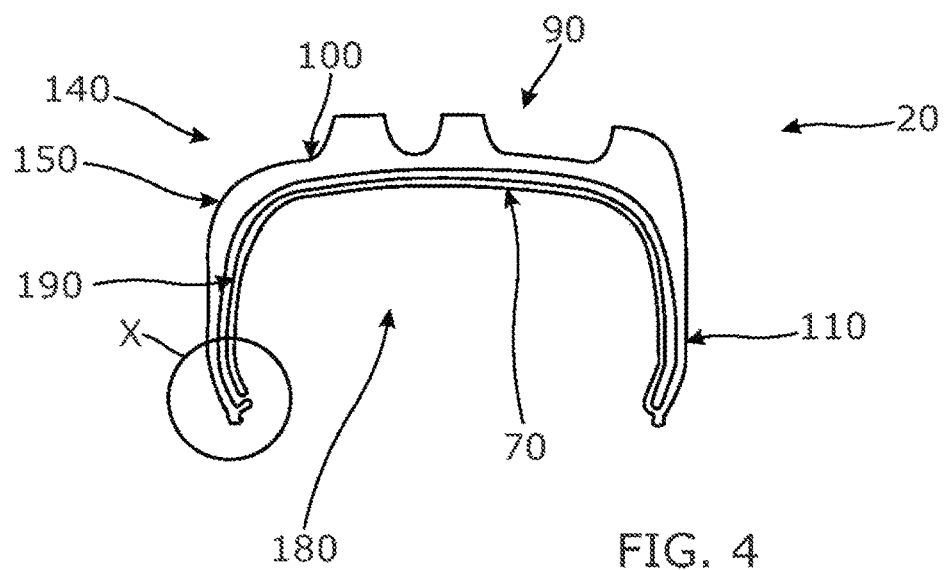
FIG. 4 shows a sectional view through the tire indicated with the line A-A in FIG. 2.
Figure 4A:
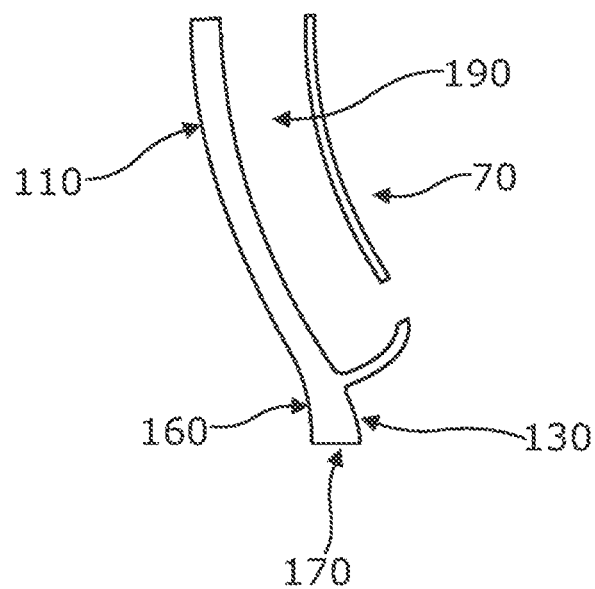
FIG. 4A shows a partial view of FIG. 4 on a larger scale indicated with X in FIG. 4.

FIG. 2 shows a tire 20 having a tread 140, a bead 170, a sidewall 110, a carcass 100 (as shown in FIG. 4), a shoulder 150, and a first cavity 180 (as also shown in FIG. 4). The first cavity 180 comprises a volume with which the tire 20 is filled. The tread 140 is the shaped outer periphery of the tire 20, which comes into contact with the ground surface. The portion of the tread 140 that is in contact with the ground at a given moment is the contact patch 90. The tire bead 170 secures the tire 20 to the wheel hub 25, which is shown in FIG. 1. The sidewall 110 is the part of the tire 20 that bridges between the tread 140 and the bead 170. The carcass 100, indicated generally in FIG. 4, is the general structural component of the tire, giving a strengthening layer providing strength in the sidewall area 110 and support for the tread 140 across the area between the sidewalls 110. The bead 170 has a bead toe 130 on the inner edge and a bead heel 160 on the outer edge (as shown in FIG. 4A).

Stiffening lines 70 are arranged inside of the carcass 100 of the tire 20 and in the embodiment shown are firmly attached to the inner side of the carcass 100 by vulcanization. The stiffening lines 70 are aligned in a generally transverse direction with regard to the periphery of the tire (that is to say they lie in a plane that includes the axis of the wheel hub 25 on which the tire 20 is mounted) and extend inside of the carcass 100 along the side walls 110 and the tread 140 of the tire 20. Each stiffening line 70 is an elongate hollow body comprising a second cavity 190 as shown in FIG. 4. The shown tire 20 (with the exception of the stiffening lines 70) may be, for example, of size 900/65R46, as is used on farm machinery such as the Fendt 1000 Vario tractor, which tire has an air volume of up to around 1900 liters in the first cavity 180. To adjust the stiffness of the tire 20 and its contact patch 90, the second cavity 190 of the stiffening lines 70 may be filled. The comparatively small volume (of around 20 liters) of the second cavity 190 is quickly filled with pressurized fluid, in this case a hydraulic oil, by the pump 40 of the tractor pressure supply system 30, which tractor pressure supply systems can typically deliver up to 240 liters per minute. As will be understood, the number of stiffening lines 70 deployed around the periphery of the tire 20 may depend on the dimensions of the tire 20; for example twenty-four (24) stiffening lines 70, as displayed in FIG. 5, could be used for the above-mentioned 900/65R46 tire size.

FIG. 4 shows a sectional view of FIG. 2 taken on the line indicated with A-A. FIG. 4 shows the tire 20 with its first cavity 180 and one of the attached stiffening lines 70 with its second cavity 190. The second cavity 190, which is aligned in a transverse direction across the periphery of the tire 20 extends along the side wall 110, along the curvature of the shoulder 150, and across the interior portion of the tread 140 of the tire 20. As mentioned above, the second cavity 190 suitably lies generally along a plane that includes the axis of the wheel hub 25 on which the tire 20 is mounted), but the second cavity 190 may have a slight angular offset from this planar alignment (e.g., by 3°, 5°, 7°, or 10°).

The part of the tread 140 that is in direct contact with the ground is the contact patch 90. In a field working mode, the stiffening lines 70 are depressurized and the pressure in the second cavities 190 may be released to atmosphere. The stiffening lines 70 are in a pressure free state so that the walls of the stiffening lines 70 are soft and pliable, enabling a large contact patch 90 with a low tire pressure. In a street travelling mode, a high tire pressure and a small tire contact patch 90 is desirable. Accordingly, the stiffening lines 70 are filled with the pressurized fluid supplied by the pump 40 (FIG. 1) to a high pressure (e.g., 160 bar, 200 bar, 240 bar, etc.) as compared to a typical first cavity pressure in road travelling mode of, for example 2.4 bar. The stiffening lines 70 therefore become relatively unyielding and produce a stiffer carcass 100, providing a smaller tire contact patch 90.

FIG. 4A shows the stiffening lines 70 and the second cavity 190 in more detail (the circled portion indicated at X in FIG. 4). The pressure supply system 30 (FIG. 1) supplies the pressurized fluid, which is delivered to the stiffening lines 70 via the rotary union 50 (FIG. 1) and a line connection point. The line connection point is in fluid communication with the supply line 80 (FIG. 1). If the pump 40 of the pressure supply system 30 can deliver up to about 240 liters per minute and the second cavity 190 defined by the stiffening lines 70 only holds a volume of about 20 liters, the stiffening lines 70 can be pressurized within seconds.

Figure 5:
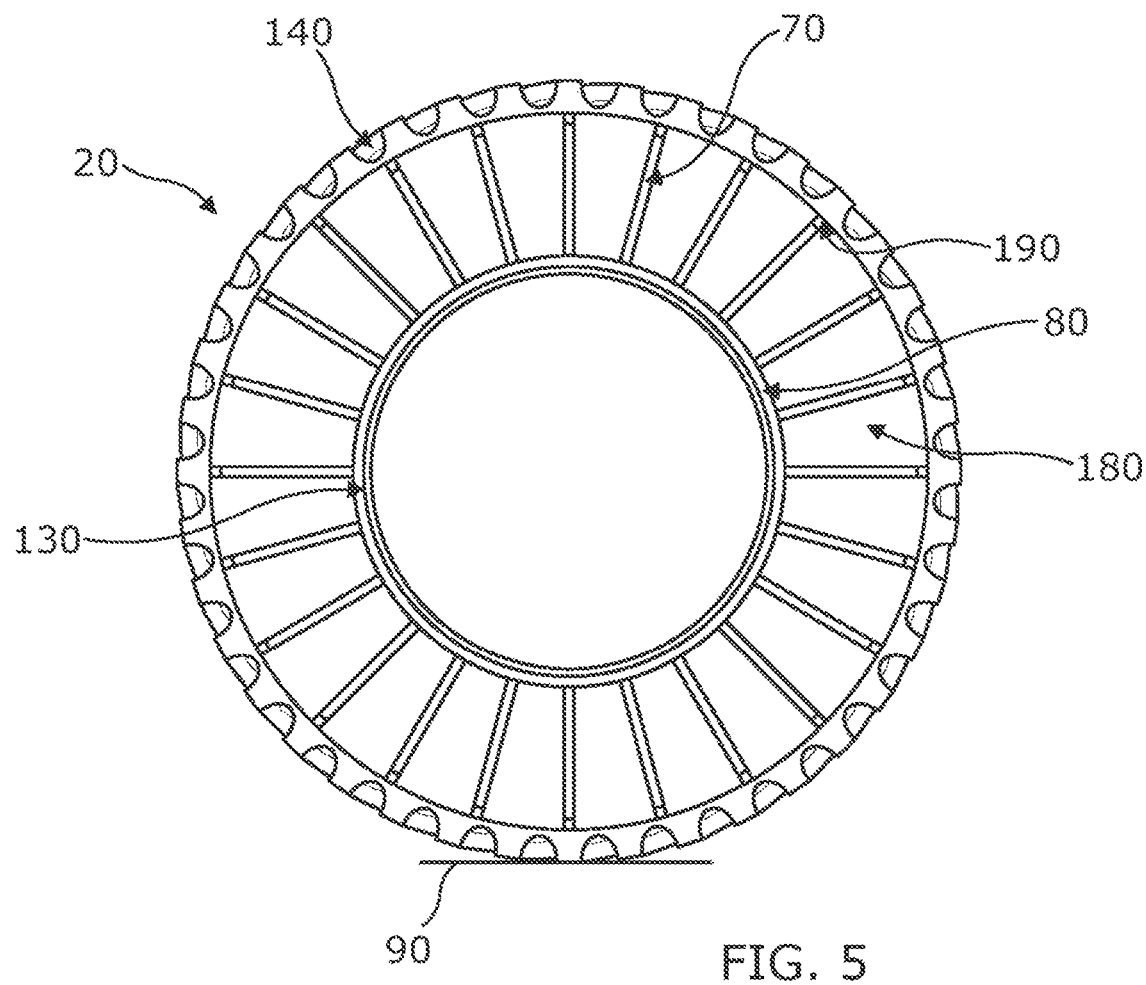
FIG. 5 shows a sectional side view through the tire indicated with the line B-B in FIG. 2.

FIG. 5 shows an arrangement in which all stiffening lines 70 are connected to each other with a single supply line 80, so they can be pressurized quickly. The supply line 80 extends along the bead toe 130 on the inside of the tire 20 and is fixed there in like manner to the attachment of stiffening lines 70. Alternately, the supply line 80 can consist of two pieces, which are concentric to the wheel axis and are connected to various of the stiffening lines 70 hydraulically with a T-shaped connection. Further alternately, an ancillary supply line portion may run around the bead toe on the opposite side of the tire to the first bead toe and link together the distal ends of stiffening lines 70 extending from the first supply line.

Figure 6:
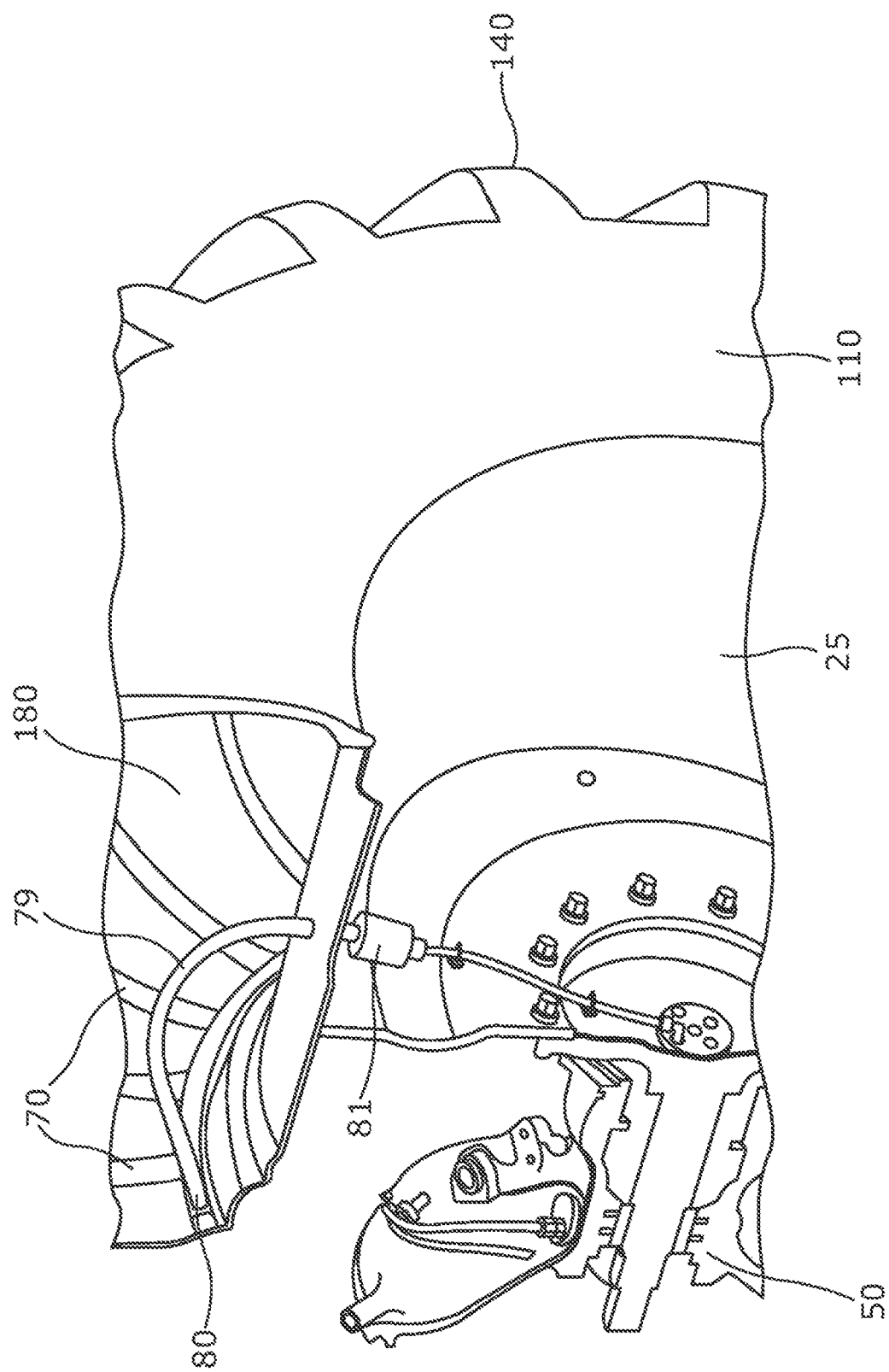
FIG. 6 shows connection components for a tire such as that of FIG. 2.

Referring additionally to FIG. 6, connected to the rotary union 50 via a supplementary supply line or hose 79, the supply line 80 supplies all the stiffening lines 70 conjointly with the pressurized hydraulic oil. A controlling element 81 in form of an electromagnetic closing valve or similar may seal the stiffening lines 70 when pressurized, such that the rotary union 50 need not be under pressure during the whole usage of the stiffening lines 70. This can reduce the risk of damages, for example through wear. The controlling element 81 is in fluid connection with the supply line 80 via the supplementary supply line or hose 79 and therefore also the stiffening lines 70 and can be located on the tire 20. For example, the supply line or hose 79 may be fixed to the rim or within the first cavity 180 of the tire 20. With the above-described arrangement, the pressure of all stiffening lines 70 and therefore also the stiffness of the tires 20 may be adjusted substantially simultaneously, and at a more efficient rate while the tractor 10 is still in operation (i.e., travelling on a first road/field terrain and about to transition to a second field/road terrain).

A stiffening line 70 may be a fluid hose or tube attached to the inner side of the tire carcass 100 and which is capable of being pressurized. In other embodiments, the stiffening line 70 can be any suitable structure capable of holding pressurized fluid, and may, for example, be integrated into the carcass 100 of the tire 20.

An advantage of the tire 20 described herein compared to the state of the art is the ability to change the stiffness of a tire 20 very quickly. For comparison, a commonly used tire-pressure adjustment device would take up to fifteen (15) minutes to increase the pressure of a tractor working tire, for example from 0.8 bar (field working mode) to 2.4 bar (road travelling mode). The tire 20 with the installed stiffening lines 70 can provide increased stiffness in seconds, because of the small volume of the second cavity 190, which holds only a relatively small volume, such as from about 10 liters to about 50 liters. This results in the relatively fast pressurizing of the stiffening lines 70 and therefore the fast adjustment of the tire 20 stiffness and therefore a significant reduction of the waiting time. The tires 20 can provide a better grip, traction, and movement of the tread 140 with a larger contact patch 90 when needed, and also a greater fuel economy due to a smaller contact patch 90 when travelling on a road, yet avoid excessive delays for transitions.

All references cited herein are incorporated herein in their entireties. If there is a conflict between definitions herein and in an incorporated reference, the definition herein shall control.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventors. Further, embodiments of the disclosure have utility with different and various machine types and configurations.

What is claimed is:
1. A tire comprising:
a carcass having a bead, a shoulder, and a sidewall, which together partially define a first cavity;
a tread carried by the carcass;
a plurality of stiffening lines spaced apart in a circumferential direction of the tire, each stiffening line attached to an inner surface of the carcass along the sidewall and the tread and defining a second cavity within the carcass and adjacent the first cavity, wherein the second cavity is aligned in an approximately transverse direction relative to a periphery of the tire, and wherein the second cavity is configured to be fluidly connected to a pressurized fluid supply system to adjust the stiffness of the tire in use, and wherein the rigidity of each of the plurality of stiffening lines is dependent on a fluid pressure within the second cavity.

2. The tire of claim 1, wherein each stiffening line of the plurality is integrated in the carcass of the tire.

3. The tire of claim 1, wherein each stiffening line of the plurality is radially aligned to a center of the tire.

4. The tire of claim 1, wherein each stiffening line of the plurality is configured to be controllably pressurized by a pressurized fluid supply system.

5. The tire of claim 1, wherein at least two stiffening lines of the plurality are fluidly connected to each other with at least one supply line operatively connectable to a pressurized fluid supply system.

6. The tire of claim 1, further comprising a supply line fluidly connecting the plurality of stiffening lines to one another.

7. The tire of claim 1, wherein each stiffening line of the plurality is configured to contain a pressurized fluid.

8. The tire of claim 7, wherein each stiffening line of the plurality is configured to contain pressurized hydraulic oil.

9. A machine comprising:
a chassis;
a pressurized fluid supply system;
at least one wheel supporting the chassis, the at least one wheel comprising:
a hub;
a tire mounted to the hub, the tire comprising:
a carcass having a bead, a shoulder, and a sidewall, wherein the bead, shoulder, sidewall and hub together define a first cavity;
a tread carried by the carcass;
a plurality of stiffening lines spaced apart in a circumferential direction of the tire, each stiffening line attached to an inner surface of the carcass along the sidewall and the tread and defining a second cavity within the carcass and adjacent the first cavity, wherein the second cavity is aligned in an approximately transverse direction relative to a periphery of the tire, and wherein the second cavity is fluidly connected to the pressurized fluid supply system, and wherein the rigidity of each of the plurality of stiffening lines is dependent on a fluid pressure within the second cavity.

10. The machine of claim 9, further comprising a control system configured to regulate the pressure of fluid in each stiffening line of the plurality to vary the stiffness of the tire.

11. The machine of claim 9, wherein the machine comprises an agricultural tractor.

12. The machine of claim 9, wherein the pressurized fluid supply system comprises a pump.

13. The machine of claim 9, wherein the at least one wheel is connected to the chassis by a rotary union defining a fluid flow path from the pressurized fluid supply system to the second cavity.

14. The machine of claim 9, further comprising a controlling element configured to close a fluid connection from the second cavity in the tire to the pressurized fluid supply system.

15. The machine of claim 14, wherein the controlling element comprises a valve.

16. The machine of claim 15, wherein the valve comprises an electromagnetic closing valve.

17. A wheel comprising:
a hub;
a tire mounted to the hub, the tire comprising:
a carcass having a bead, a shoulder, and a sidewall, wherein the bead, shoulder, sidewall and hub together define a first cavity;
a tread carried by the carcass;
a plurality of stiffening lines spaced apart in a circumferential direction of the tire, each stiffening line attached to an inner surface of the carcass along the sidewall and the tread and defining a second cavity within the carcass and adjacent the first cavity, wherein the second cavity is aligned in an approximately transverse direction relative to a periphery of the tire, and wherein the second cavity is configured to be fluidly connected to a pressurized fluid supply system to adjust the stiffness of the tire in use, and wherein the rigidity of each of the plurality of stiffening lines is dependent on a fluid pressure within the second cavity.

18. The wheel of claim 17, further comprising a controlling element configured to close a fluid connection from the second cavity in the tire to a pressurized fluid supply system.

19. The wheel of claim 18, wherein the controlling element comprises a valve.

20. The wheel of claim 19, wherein the valve comprises an electromagnetic closing valve.

\* \* \* \* \*